(12) United States Patent
Ramnani et al.

(10) Patent No.: US 11,556,393 B2
(45) Date of Patent: Jan. 17, 2023

(54) ENVIRONMENT AWARE APPLICATION-BASED RESOURCE MANAGEMENT USING REINFORCEMENT LEARNING

(71) Applicant: Adobe Inc., San Jose, CA (US)

(72) Inventors: Bhakti Ramnani, Jaora District Ratlam (IN); Sachin Tripathi, Bengaluru (IN); Reetesh Mukul, Bengaluru (IN); Prabal Kumar Ghosh, Bengaluru (IN)

(73) Assignee: Adobe Inc., San Jose, CA (US)

( * ) Notice: Subject to any disclaimer, the term of this patent is extended or adjusted under 35 U.S.C. 154(b) by 377 days.

(21) Appl. No.: 16/736,476

(22) Filed: Jan. 7, 2020

(65) Prior Publication Data
US 2021/0209419 A1 Jul. 8, 2021

(51) Int. Cl.
*G06F 9/50* (2006.01)

(52) U.S. Cl.
CPC .......... *G06F 9/5077* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 10,007,555 B1 * | 6/2018 | Kuhne | .................. | G06F 3/0481 |
| 10,509,683 B2 * | 12/2019 | Furman | ................. | G06F 9/5061 |
| 10,761,897 B2 * | 9/2020 | LaBute | ............... | H04L 41/0823 |
| 11,157,488 B2 * | 10/2021 | Feuz | ...................... | G06N 20/00 |
| 2012/0109619 A1 * | 5/2012 | Gmach | ................ | G06Q 10/067 703/21 |
| 2015/0058265 A1 * | 2/2015 | Padala | ................ | G06F 9/45558 706/12 |
| 2019/0095796 A1 * | 3/2019 | Chen | ..................... | G06N 3/0454 |
| 2019/0312800 A1 * | 10/2019 | Schibler | .................... | G06F 8/65 |
| 2019/0370643 A1 * | 12/2019 | Aflalo | .................. | G06F 9/5044 |
| 2020/0167686 A1 * | 5/2020 | Mallya Kasaragod | ...................... | G06F 30/20 |
| 2020/0167687 A1 * | 5/2020 | Gene | ...................... | G06N 3/006 |

(Continued)

OTHER PUBLICATIONS

Telenyk et al.; "Modeling of the data center resource management using reinforcement learning"; IEEE 2018; (Telenyk_2018.pdf; pp. 1-8) (Year: 2018).*

(Continued)

*Primary Examiner* — Hiren P Patel
(74) *Attorney, Agent, or Firm* — FIG. 1 Patents

(57) ABSTRACT

A resource management system of an application takes various actions to improve or maintain the health of the application (e.g., keep the application from becoming sluggish). The resource management system maintains a reinforcement learning model indicating which actions the resource management system is to take for various different states of the application. The resource management system performs multiple iterations of a process of identifying a current state of the application, determining an action to take to manage resources for the application, and taking the determined action. In each iteration, the resource management system determines the result of the action taken in the previous iteration and updates the reinforcement learning model so that the reinforcement learning model learns which actions improve the health of the application and which actions do not improve the health of the application.

20 Claims, 6 Drawing Sheets

(56) References Cited

U.S. PATENT DOCUMENTS

| | | | |
|---|---|---|---|
| 2020/0257968 A1* | 8/2020 | Mitra | G06F 9/4881 |
| 2020/0396280 A1* | 12/2020 | Norris | H04L 43/0852 |
| 2020/0409829 A1* | 12/2020 | Bedi | G06F 11/3684 |
| 2021/0081787 A1* | 3/2021 | Qi | G06N 3/0472 |

OTHER PUBLICATIONS

"Bandit Algorithms", Retrieved at: https://banditalgs.com/—on Oct. 22, 2019, 5 pages.

Bauerle,"Markov Decision Processes with Applications to Finance", Springer 2011, Jan. 2011, 405 pages.

Cesa-Bianchi,"Prediction, learning, and games", Cambridge university press, Jan. 2006., 403 pages.

Lattimore,"Bandit Algorithms—Book", Jun. 27, 2019, 575 pages.

Russo,"A Tutorial on Thompson Sampling", Nov. 2017, 96 pages.

Sutton,"Reinforcement Learning: An Introduction", The MIT Press Cambridge, Massachusetts, Mar. 1, 1998, 398 pages.

* cited by examiner

ENVIRONMENT AWARE APPLICATION-BASED RESOURCE MANAGEMENT USING REINFORCEMENT LEARNING

BACKGROUND

As computer technology has advanced, applications have become increasing complex. This increasing complexity results in applications using increasing amounts of system resources, such as memory, processor bandwidth, input/output (I/O) bandwidth, and so forth. This can result in situations where an application becomes sluggish. For example, in a photography application, operations involving stitching panoramas from multiple images or applying batch edits to multiple images tend to use a significant amount of memory and processor resources that can cause the photography application to become sluggish or even non-responsive to user inputs for periods of time.

Conventional solutions to managing resources in a computer are implemented by the computer operating system. The operating system manages various processes of the various applications running on the computer by allocating resources to those processes, such as allocating memory to the processes, allocating processor time to the processes (e.g., schedule processes to execute for different amounts of time), and so forth.

This resource management by the operating system has benefits, but is not without its problems. One such problem is that although the operating system is allocating memory to the processes and scheduling the processes for execution, the operating system typically lacks knowledge of the nature of the work being performed by the processes. For example, the operating system may know that a particular process corresponds to a particular application, but does not know whether that process is simply displaying an image, is stitching panoramas from multiple images, and so forth.

Accordingly, conventional resource management solutions can cause applications to remain sluggish or non-responsive to user inputs for periods of time, resulting in user dissatisfaction and frustration with their computers and applications.

SUMMARY

To mitigate the drawbacks of conventional resource management solutions, a resource management system as implemented by a computing device is described to provide environment aware application-based resource management using reinforcement learning. A previous action performed in a previous iteration of multiple iterations to manage computing device resource usage by the application is identified by an application. A current state of the application indicating a current health of the application is determined, the current state being one of multiple states for the application. A reward value to apply based at least in part on the current state of the application is determined, and a reinforcement learning model, which associates each of multiple actions with each of the multiple states, is updated by distributing the reward value across action values associated with at least one action. An action of the multiple actions associated with the current state is selected based on the reinforcement learning model, and the selected action is performed to modify usage of at least one computing device resource.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
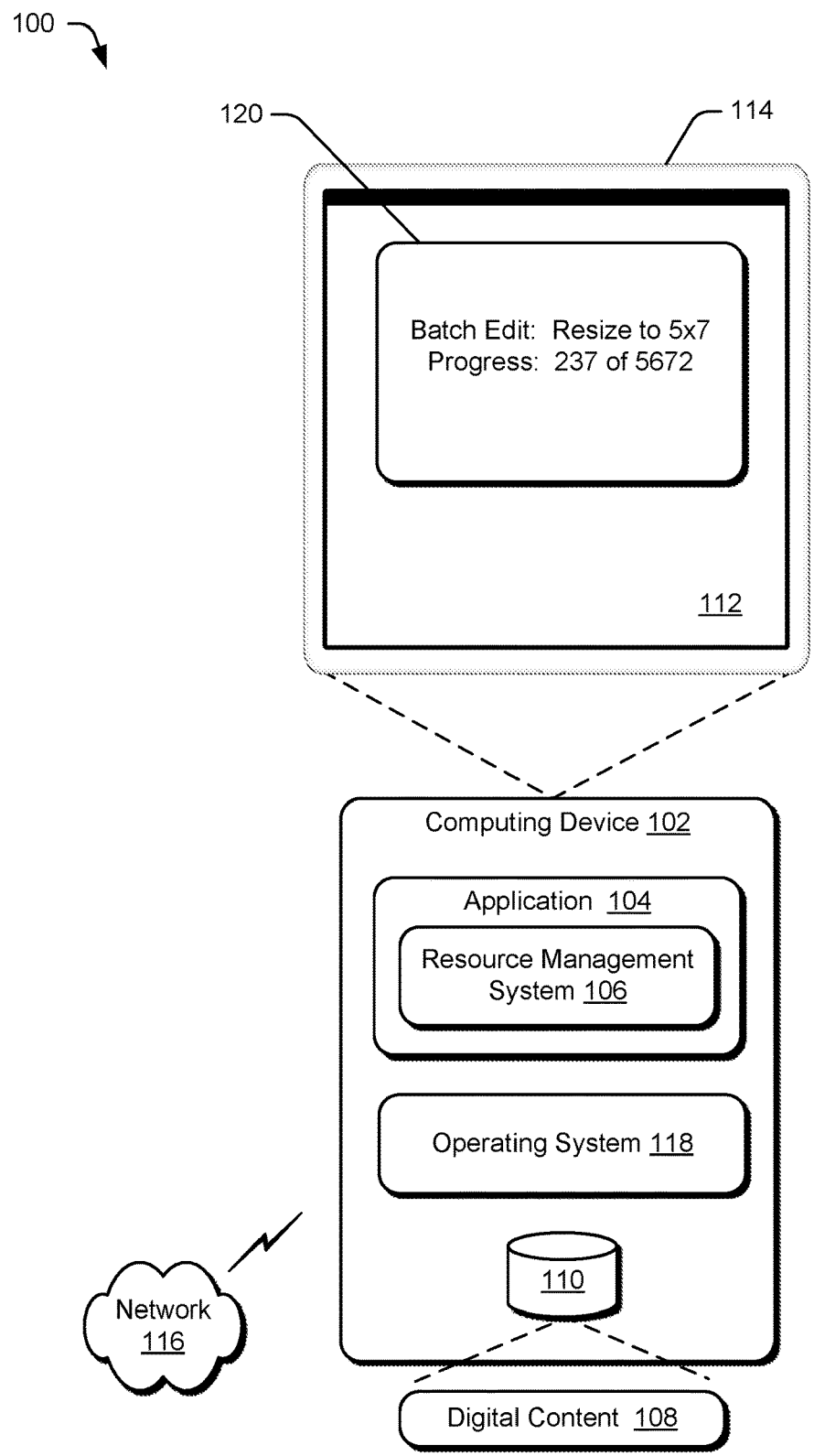
FIG. 1 is an illustration of a digital medium environment in an example implementation that is operable to employ the environment aware application-based resource management using reinforcement learning described herein.

Current solutions for resource management in a computing device are typically implemented by the operating system of the computing device. The operating system, however, lacks knowledge of the nature of the work being performed by each application and thus is not able to anticipate resource usage by an application or alter aspects of the workflow. Although conventional applications can request that the operating system allocate them memory, and can release allocated memory when no longer needed, conventional applications typically do not have further resource management capabilities.

To overcome these problems, environment aware application-based resource management using reinforcement learning techniques are discussed herein. Generally, an application includes a resource management system that takes various actions to improve or maintain the health of the application (e.g., keep the application from becoming sluggish). The resource management system maintains a reinforcement learning model indicating which actions the resource management system is to take for various different states of the application. The resource management system performs multiple iterations of a process of identifying a current state of the application, determining an action to take to manage resources for the application, and taking the determined action. In each iteration, the resource management system determines the result of the action taken in the previous iteration and updates the reinforcement learning model so that the reinforcement learning model learns which actions improve the health of the application and which actions do not improve the health of the application.

More specifically, in each iteration a current environment description is obtained that describes various aspects of the current operating environment of the application, such as the nature of the workflow being performed by the application, the system resources available or being consumed in the computing device, user interface interactivity for the computing device, combinations thereof, and so forth. The nature of the workflow being performed by the application refers to the type of operations being performed by the application (e.g., what the application is doing). For example, for a photography application, the workflows may include image editing, metadata operations, face detection, image stitching, batch image editing, and so forth. The system resources available or being consumed in the computing device can include, for example, the amount of memory used by the application, the amount of memory available to the application an amount of disk I/O performed by the application 104, and so forth. The user interface interactivity for the application refers to the swiftness or responsiveness of the user interface, such as whether user interface objects (e.g., icons, thumbnails, buttons, menu items) are responsive to user inputs.

A state of the application indicating the health of the application (e.g., whether the application is sluggish or is expected to be sluggish) is determined based on the current environment description. The state of the application reflects a particular goal to be satisfied for the application, such as to reduce memory usage by the application, to increase the speed of data (e.g., image) export or import by the application, and so forth. In one or more implementations, the application is deemed to be in one of three states: a green state indicating that the application is healthy (e.g., indicating high interactivity of user interface interactivity), a yellow state indicating increasing usage of system resources by the application (e.g., that can make the application sluggish), and a red state indicates an alarm state for the application (e.g., the application has become sluggish).

In one or more implementations, data from the current environment description is compared to one or more threshold values to determine the state of the application. If a particular data value in the current environment description (e.g., a ratio of the amount of disk I/O performed by the application to a total amount of disk I/O performed by the computing device) does not satisfy (e.g., is below) a first threshold value, then the application is in the green state. If the particular data value in the current environment description satisfies (e.g., is equal to or greater than) the first threshold value but does not satisfy (e.g., is below) a second threshold value, then the application is in the yellow state. If the particular data value in the current environment description satisfies (e.g., is equal to or greater than) the second threshold, then the application is in the red state.

A reward value for a previous action taken by the resource management system in the previous iteration is determined based on the results of the previous action. The results of the previous action are reflected in a change in the state of the application, in changes in the data values in the current environment description, combinations thereof, and so forth. The reward value provides an indication of how well the previous action did in moving the resource management system towards its goal. In one or more implementations, a higher reward value indicates that the previous action did better at moving the resource management system towards its goal than a lower reward value indicates. Action values in a reinforcement learning model are updated based on the reward value.

In one or more implementations the reinforcement learning model includes a table having multiple rows and columns corresponding to states and actions. Each action refers to an action that can be taken by the application to attempt to achieve the goal of the resource management system, such as increasing or decreasing the rate at which the application releases memory, increasing or decreasing the number of images that are retrieved at a time (e.g., retrieved concurrently), and so forth. The reward value is distributed across one or more cells in the table. This distribution can take various forms, such as applying (e.g., adding) one portion (e.g., one-half) of the reward value to the cell corresponding to the previous state of the application and the previous action applied to the application, and another portion (e.g., one-quarter) of the reward value to each of the cells adjacent to that cell for the same state.

The resource management system selects an action based on the action values in the reinforcement learning model using any of a variety of different policies, such as an action value based policy and a random policy. One of these multiple policies is selected in a manner such that there is a higher probability (e.g., 90% probability) that the action value based policy is selected and a lower probability (e.g., 10% probability) that the random policy is selected.

The action value based policy selects an action from the reinforcement learning model based on, for the current state of the application, the action that is performing the best so far (e.g., the action corresponding to the cell having the largest action value). The action corresponding to the cell having the largest action value can be selected, or an action corresponding to a cell adjacent to the cell having the largest action value can be selected. The random policy selects an action from the model randomly.

The resource management system stores various information from the current iteration for use in the next iteration. This stored information includes, for example, the selected action, the current state, and the current environment description. The current state becomes the previous state for the next iteration performed by the resource management system.

The resource management system also performs the selected action. The selected action can be performed in any of a variety of different manners, such as changing configuration settings of the application, invoking another module or system of the application to take a particular action, and so forth.

The techniques discussed herein allow the resource management system for an application to learn, through reinforcement learning, which actions to take when the application is in different states in order to achieve a goal of the resource management system, such as to reduce memory usage by the application, to increase the speed of data (e.g., image) export or import by the application, and so forth. Different computing devices operate in different manners due to differences between the computing devices, such as different processor speeds, different numbers of processors or processor cores, different amounts of RAM, different storage device speeds, different network connection speeds, and so forth. The techniques discussed herein allow the resource management system to achieve its goal in different systems, learning the appropriate actions for different systems.

Furthermore, the techniques discussed herein allow a resource management system to take into account factors that an operating system is not aware of. For example, the operating system is not aware of the nature of the workflow that the application is performing at any given time. However, the resource management system is aware of this information can use this information in determining the appropriate actions to take to achieve the goal of the resource management system.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the environment aware application-based resource management using reinforcement learning described herein. The illustrated environment 100 includes a computing device 102, which may be configured in a variety of ways. The computing device 102, for instance, may be configured as a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including an application 104 that includes a resource management system 106. The application 104 processes and transforms digital content 108, which is illustrated as maintained in storage 110 of the computing device 102. Such processing includes creation of the digital content 108 and rendering of the digital content 108 in a user interface 112 for output, e.g., by a display device 114. The storage 110 can be any of a variety of different types of storage, such as random access memory (RAM), Flash memory, solid state drive, magnetic disk drive, and so forth. Although illustrated as implemented locally at the computing device 102, functionality of the application 104, including the resource management system 106, may also be implemented in whole or part via functionality available via a network 116, such as part of a web service or "in the cloud."

The computing device 102 also includes an operating system 118 that implements functionality to manage execution of application 104 as well as other applications on the computing device 102, to operate as an interface between the application 104 and hardware of the computing device 102, and so forth. The operating system 118 performs some resource management in the computing device 102, such as scheduling processes of the application 104 for execution, allocating memory to the application 104, and so forth. The resource management functionality provided by the resource management system 106 is in addition to any resource management performed by the operating system 118.

The resource management system 106 implements functionality to manage resource usage by the application 104. This resource management performed by the resource management system 106 refers to management of resources or access to resources within the control of the application 104. This management is different than the resource management performed by the operating system 118 (e.g., the resource management system 106 does not schedule processes for execution, does not allocate memory to application 104, and so forth). For example, the resource management performed by the resource management system 106 can include determining when to release memory, determining how long to work on the release of memory, determining whether to increase or decrease how many images are retrieved at a time, and so forth. Furthermore, the resource management system 106 can make these determinations based on the particular workflow(s) being performed by the application 104. E.g., the resource management system 106 can make different resource management decisions if a current workflow of the application 104 is stitching together images than if the current workflow of the application 104 is performing batch editing of images.

For example, the user interface 112 includes a status display 120 indicating that a batch edit of images to resize the images to 5×7 is being performed by the application 104. The workflow for editing a batch of images includes retrieving the images from a storage device (such as storage 110), performing the desired editing, and saving the edited images back to the storage device. The resource management system 106, during the editing of the batch of images or in anticipation of a user request to edit a batch of images, can manage resource usage to maintain responsiveness of the user interface provided by the application 104 and avoid sluggish behavior by the application 104. This resource management can include, for example, requesting additional memory be allocated to the application 104, determining how many images are retrieved from the storage device at a time during the workflow, and so forth.

It should be noted that although a single application 104 is illustrated in FIG. 1, the computing device 102 can include any number of applications. Any additional applications included in the computing device 102 can also include a resource management system 106 to manage resource usage by that application.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Resource Management System Architecture

Figure 2:
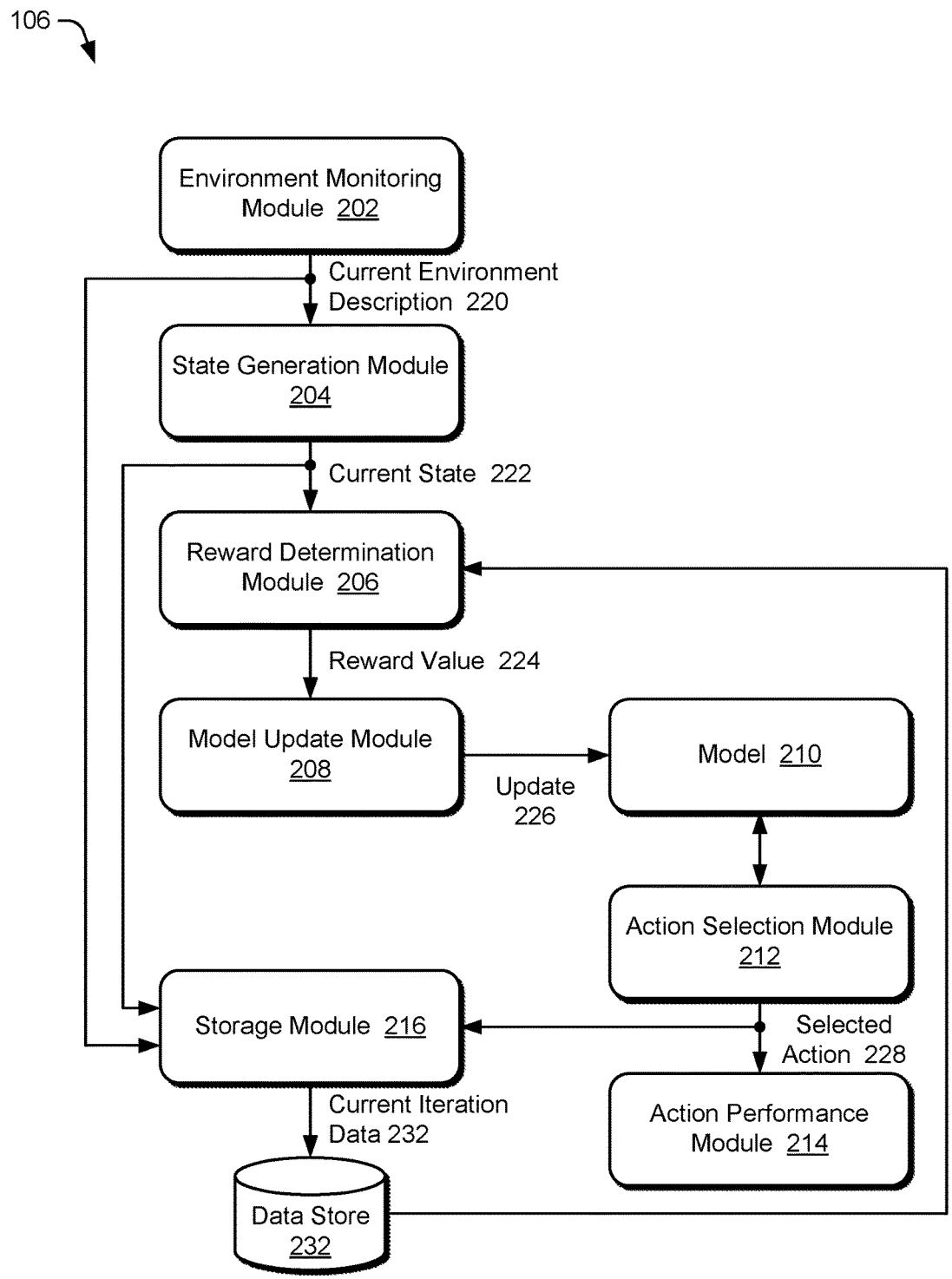
FIG. 2 is an illustration of an example architecture of a resource management system.

FIG. 2 is an illustration of an example architecture of a resource management system 106. The resource management system 106 includes an environment monitoring module 202, a state generation module 204, a reward determination module 206, a model update module 208, a model 210, an action selection module 212, an action performance module 214, and a storage module 216.

Generally, the resource management system 106 takes various actions to improve or maintain the health of the application 104 (e.g., keep the application from becoming sluggish), and maintains a reinforcement learning model indicating which actions the resource management system 106 is to take for various different states of the application. The resource management system 106 performs multiple iterations of a process of identifying a current state of the application 104, determining an action to take to manage resources for the application 104, and taking the determined action. The resource management system 106 can make various decisions and determinations based on a current operating environment of the application 104 for the current iteration and a previous operating environment of the application 104 for a previous iteration (typically the most recent iteration prior to the current iteration).

The iterations can be performed at various regular or irregular intervals, such as every two seconds. The interval between iterations can also vary based on the application 104 and computing device 102 environment, or the state of the application 104. For example, in situations in which there is a significant amount of memory pressure or CPU usage, the interval can be reduced (e.g., to performing an iteration once every second). By way of another example, in situations in which the application 104 is in one state (e.g., a red state as discussed in more detail below), an iteration can be performed every second, whereas in situations in which the application 104 is in another state (e.g., a green state as discussed in more detail below), an iteration can be performed every three or four seconds.

In each iteration, the environment monitoring module 202 obtains a description of the current operating environment of the application 104, such as the nature of the workflow being performed by the application 104, system resources available or being consumed, user interface interactivity, and so forth. The state generation module 204 uses the description of the current operating environment to determine a state of the application 104 indicating the health or criticality of the application (e.g., whether the application is expected to be sluggish, whether the application is going through high RAM consumption, whether the application is going through high processor usage, etc.).

The reward determination module 206 determines a reward value for a previous action taken by the resource management system 106 based on the results of the previous action (e.g., any change in the state of the application 104). The model update module 208 updates action values in the model 210 based on the reward value. The action selection module 212 selects an action based on the action values in the model 210, and outputs the selected action. The action performance module 214 performs the selected action (e.g., setting a number of images to obtain when performing a batch image edit). The storage module 216 stores a record of the selected action, the description of the current operating environment of the application 104, and the current state of the application 104. This allows subsequent actions to be taken based on previously selected actions, operating environments, and states.

More specifically, the environment monitoring module 202 obtains various information regarding the current operating environment of the application 104, and outputs the obtained information as a current environment description 220. The current environment description 220 describes various aspects of the current operating environment of the application 104, such as the nature of the workflow being performed by the application 104, the system resources available or being consumed in the computing device 102, user interface interactivity for the computing device 102, combinations thereof, and so forth. In one or more implementations, the current environment description 220 is a tuple E where E=(N, S, U), N refers to the nature of the workflow being performed by the application 104, S refers to one or more factors that depict overall health of the application 104, and U refers to user interface interactivity for the application 104.

The nature of the workflow being performed by the application 104 (N) refers to the type of operations being performed by the application 104 (e.g., what the application is doing). The different types of operations that an application can perform can vary based on the type of application. For example, for a photography application, the workflows may include image editing, metadata operations, face detection, image stitching, batch image editing, and so forth. By way of another example, for a music application, the workflows may include music playback, music editing, format conversion, batch format conversion, and so forth.

The environment monitoring module 202 has knowledge of the different workflows performed by the application 104 as well as knowledge of when a particular workflow is being performed (or is about to be performed) by the application 104. The environment monitoring module 202 can obtain this knowledge in a variety of different manners. For example, the environment monitoring module 202 can be pre-configured or pre-programmed with this knowledge, can obtain the knowledge from another device or system, can obtain the knowledge from metadata associated with the application 104, and so forth. In one or more implementations, this knowledge of the different workflows and when a particular workflow is being performed is provided by a developer or designer of the application 104. Such a developer or designer is aware of the various workflows of the application 104 and how to determine whether the workflows are being performed (e.g., user inputs received to begin a particular workflow, particular actions taken by the application 104 for a particular workflow, particular modules of the application 104 that perform particular workflows, a particular process that is spawned to perform a particular workflow, etc.) and provides an indication of those workflows and how to determine which workflow is being performed to the environment monitoring module 202.

Different workflows can use different resources or the same resources differently. Accordingly, including the nature of the workflow in the current environment description 220 allows different actions to be learned by the reinforcement learning model for different workflows.

The one or more factors that depict overall health of the application 104 (S) refers to one or more of various factors that depict resources consumed by or available to the application 104. These one or more factors can include, for example, memory consumed by the application 104, such as the amount of memory used by the application 104. By way of another example, these one or more factors can include memory available to the application 104, the amount of memory allocated to the application 104 by the operating system 118. By way of another example, these one or more factors can include an amount of disk I/O performed by the application 104. By way of yet another example, these one or more factors can include an amount of network I/O performed by the application 104. By way of still another example, these factors can include memory pressure in the computing device 102 (e.g., an amount of memory in the computing device 102 being used compared to how much memory is available in the computing device 102 for use).

The environment monitoring module 202 can obtain data describing these one or more factors in a variety of different manners. For example, the environment monitoring module 202 can obtain data describing these one or more factors (e.g., the amount of memory used by the application 104) from the application 104 itself. By way of another example, the environment monitoring module 202 can obtain data describing these one or more factors (e.g., an amount of disk I/O or network I/O performed by the application 104) from the operating system 118.

The user interface interactivity for the application 104 (U) refers to the swiftness or responsiveness of the user interface, including whether user interface objects (e.g., icons, thumbnails, buttons, menu items) are responsive to user inputs. The swiftness or responsiveness of the user interface can be measured or evaluated in a variety of different manners. In one or more implementations, the swiftness or responsiveness of the user interface is measured or evaluated based on whether user interface objects for the application 104 are being filled or displayed at an acceptable rate (e.g., at least a threshold rate). For example, whether requested thumbnail images are retrieved and displayed at at least a threshold rate. Additionally or alternatively, the swiftness or responsiveness of the user interface can be measured or evaluated based on whether a user can interact with user interface objects at an acceptable rate (e.g., at least a threshold rate). For example, whether a delay between a user input (e.g., user selection of a user interface object) and performing of the requested action (e.g., the action associated with the user interface object) is less than a threshold amount.

The state generation module 204 uses the current environment description 220 to determine a state of the application 104 indicating the health of the application (e.g., whether the application is sluggish or is expected to be sluggish). The state generation module 204 can use any of the various data, or any combination of the various data, included in the current environment description 220 in determining the state of the application 104. Furthermore, the state generation module 204 can use different data in the current environment description 220 in determining the state of the application 104 for different workflows.

Any of a variety of different rules or criteria can be used to determine a state of the application 104. Generally, the rules or criteria, as well as the particular data in the current environment description 220, are those that allow a particular goal to be satisfied. This goal can be specified in any of a variety of different manners, such as by a developer or designer of the resource management system 106 (e.g., and pre-programmed or pre-configured in the resource management system 106), by a user of the resource management system 106 (e.g., a user preference setting for the user to indicate which goal he or she would like to be satisfied), and so forth.

Any of a variety of different goals can be satisfied, such as goals related to performance of the application 104, goals related to resource usage by the application 104, and so forth. For example, a goal may be to reduce memory usage by the application 104. In such situations, the state generation module 204 can use data in the current environment description 220 regarding memory usage by the application 104. By way of another example, a goal may be to increase the speed of data (e.g., image) export or import by the application 104 (e.g., how quickly a set of images is exported or imported by the application 104). In such situations, the state generation module 204 can use data in the current environment description 220 regarding an amount of disk I/O or network I/O performed by the application 104, or performed by the computing device 102 across all applications.

In one or more implementations, the state generation module 204 determines that the application 104 is in one of three different states based on the current environment description 220. These states are labeled, for example, a green state, a yellow state, and a red state. The green state denotes that the application 104 is healthy with respect to environment E. For example, the green state can represent high interactivity of user interface interactivity, can represent that all operations are being performed within a threshold amount of time, and so forth. The green state is a non-alarming or stable state of the application 104.

The yellow state is a warning state of the application 104. The yellow state can denote increasing usage of system resources by the application 104 that can make the application 104 sluggish, thereby decreasing user interface interactivity. The yellow state can also denote that the application 104 is reaching towards a situation where the application 104 cannot honor any more tasks. The red state is the alarming state of the application 104. If application 104 reaches the red state, typically the application 104 has become sluggish.

An objective of the resource management system 106 is to prevent the application 104 from reaching the red state, and if the application 104 does reach the red state that it quickly moves back to the yellow or green state. The resource management system 106 selects one or more actions to be performed in order to keep the application 104 in, or return the application to, the green or yellow state as discussed in more detail below.

In one or more implementations, the state generation module 204 compares data from the current environment description 220 to one or more threshold values to determine the state of the application 104. If a particular data value in the current environment description 220 does not satisfy (e.g., is below) a first threshold value, then the application 104 is in the green state. If the particular data value in the current environment description 220 satisfies (e.g., is equal to or greater than) the first threshold value but does not satisfy (e.g., is below) a second threshold value, then the application 104 is in the yellow state. If the particular data value in the current environment description 220 satisfies (e.g., is equal to or greater than) the second threshold, then the application 104 is in the red state.

For example, assume that the goal of the resource management system 106 is to reduce memory usage by the application 104 that contributes to memory pressure in the computing device 102, that the first threshold value is 40%, and that the second threshold value is 60%. The resource management system 106 analyzes data in the current environment description 220 indicating memory pressure, such as a ratio of the amount of RAM in the computing device 102 being used to how much RAM is available in the computing device 102 for use. If the ratio is less than 40%, then the resource management system 106 determines that the application 104 is in the green state. If the ratio is at least 40% but less than 60%, then the resource management system 106 determines that the application 104 is in the yellow state. If the ratio is at least 60%, then the resource management system 106 determines that the application 104 is in the red state.

By way of another example, assume that the goal of the resource management system 106 is to increase the speed of data import by the application 104 so that a set of images can be quickly imported into memory from a disk drive by a workflow of the application 104. Further assume that the first threshold value is 70%, and that the second threshold value is 30%. The resource management system 106 analyzes data in the current environment description 220 indicating an amount of disk I/O, such as a ratio of the amount of disk I/O performed by the application 104 to a total amount of disk I/O performed by the computing device 102. If the ratio is greater than 70%, then the resource management system 106 determines that the application 104 is in the green state. If the ratio is at least 30% but less than 70%, then the resource management system 106 determines that the application 104 is in the yellow state. If the ratio less than 30%, then the resource management system 106 determines that the application 104 is in the red state.

By way of another example, assume that the goal of the resource management system 106 is to quickly import images from a network. This results in an issue of determining how many images the workflow should try to copy from the network at one time (concurrently) because of parallelism inherent in network I/O but without overburdening the network I/O resulting in overall slower import of the images. The number of images to download over the network I/O will vary depending on different settings for the computing device and the network, such as the number of sockets available, the uplink speed, the downlink speed, resources of the computing device 102 (e.g., is space on a hard disk at the computing device 102 available, how much RAM is available, and so forth). The time taken to download each image (e.g., the time from sending the request via network I/O and receiving the entirety of the image via network I/O) is determined by the environment monitoring module 202 and included in the current environment description 220. The state generation module 204 uses the difference between the time taken to download a first set of images and a previous set of images to determine the state of the state generation module 204. If the time taken to download the first set of images is greater than the time taken to download the previous set of images, then the application 104 is in the red state. If the time taken to download the first set of images is the same as the time taken to download the previous set of images, then the application 104 is in the yellow state. If the time taken to download the first set of images is less than the time taken to download the previous set of images, then the application 104 is in the green state.

Although examples are included herein of the application 104 being in one of three states, it should be noted that the state generation module 204 can determine that the application 104 is in one of other numbers of states. E.g., the state generation module 204 can use any number of states.

The state generation module 204 outputs the determined state of the application 104 as the current state 222. The reward determination module 206 determines a reward value for a previous action taken by the resource management system 106 based on the results of the previous action. The results of the previous action are reflected in a change in the state of the application 104, in changes in the data values in the current environment description 220, combinations thereof, and so forth. The reward value provides an indication of how well the previous action did in moving the resource management system 106 towards its goal.

In one or more implementations, a higher reward value indicates that the previous action did better at moving the resource management system 106 towards its goal than a lower reward value indicates. Accordingly, the reward determination module 206 generates higher reward values if current state is an improved state (indicating that the application is healthier) over the previous state (the state in the previous iteration). So, the reward determination module 206 generates higher reward values if the previous state was the red state and the current state is the yellow state or green state, or if the previous state was the yellow state and the current state is the green state, or if the previous state and the current state are both the green state.

Figure 3:
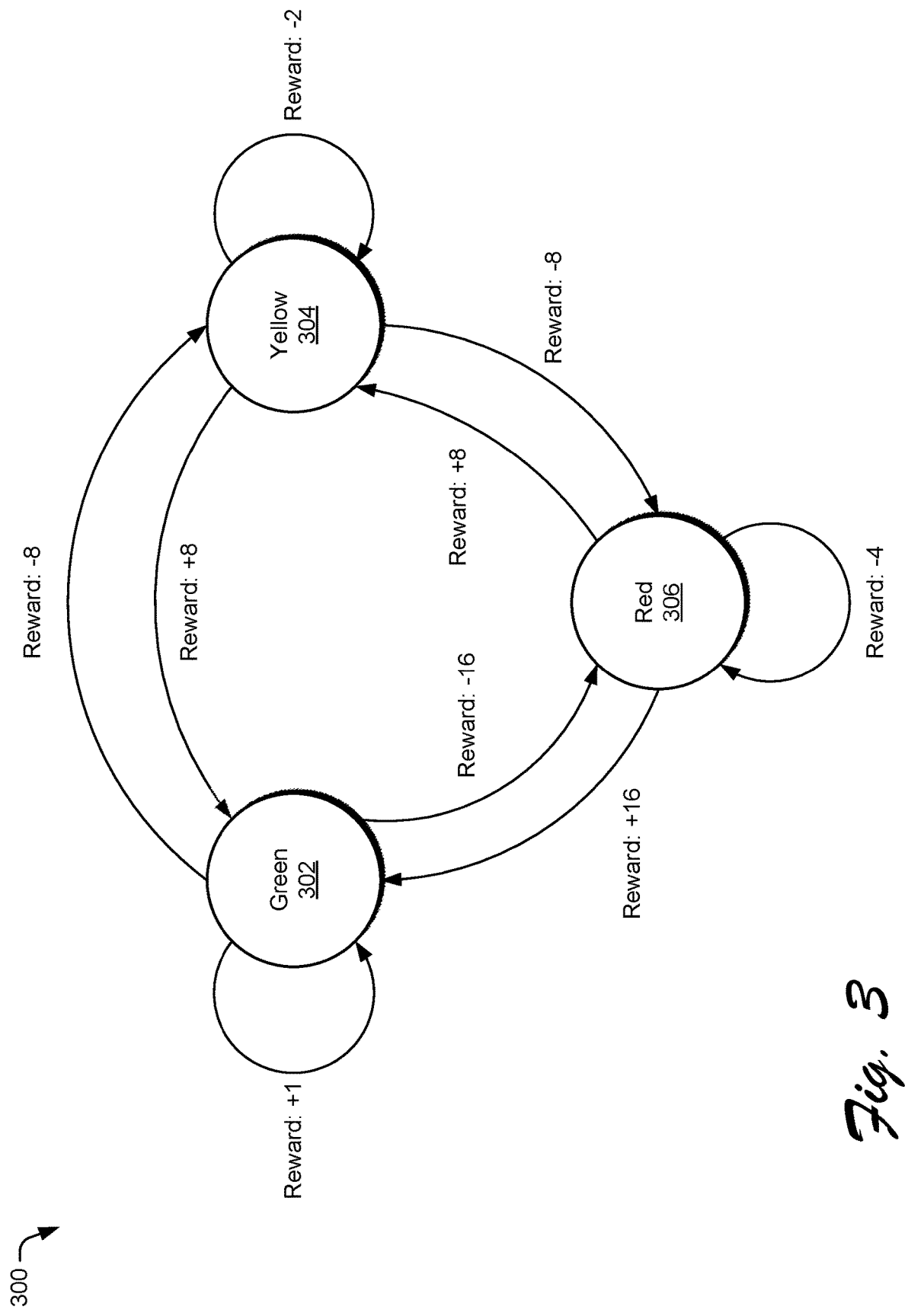
FIG. 3 illustrates an example state diagram indicating the reward values determined by the reward determination module.

FIG. 3 illustrates an example state diagram 300 indicating the reward values determined by the reward determination module 206. The state diagram 300 includes a green state 302, a yellow state 304, and a red state 306. The transition arrows indicate the transition from the previous state of the application 104 to the current state of the application 104. As shown, if the previous state was the green state 302, then a reward value of +1 is generated if the current state is the green state 302, a reward value of −8 is generated if the current state is the yellow state 304, and a reward value of −16 is generated if the current state is the red state 306. Similarly, if the previous state was the yellow state 304, then a reward value of −2 is generated if the current state is the yellow state 304, a reward value of +8 is generated if the current state is the green state 302, and a reward value of −8 is generated if the current state is the red state 306. And, if the previous state was the red state 306, then a reward value of −4 is generated if the current state is the red state 306, a reward value of +16 is generated if the current state is the green state 302, and a reward value of −8 is generated if the current state is the yellow state 304.

It should be noted that specific reward values are illustrated in the example 300. These values are only example values and different values can be used, although the relationship between the values would remain the same. For example, the reward value for transitioning from the yellow state 304 to the green state 302 may be a value other than +8 but would still be a higher value than the reward value for transitioning from the green state 302 to the yellow state 304.

Returning to FIG. 2, the reward determination module 206 can also generate a reward value based on the data in the current environment description 220. The reward determination module 206 compares data in the current environment description 220 to the data in the previously received environment description and generates a reward value based on that comparison. The data that is compared varies based on the goal of the resource management system 106.

For example, if the goal of the resource management system 106 is to reduce memory usage by the application 104 that contributes to memory pressure in the computing device 102, then the reward determination module 206 can compare the ratio of the amount of RAM in the computing device 102 being used to how much RAM is available in the computing device 102 for use in the previous environment description to the ratio of the amount of RAM in the computing device 102 being used to how much RAM is available in the computing device 102 for use in the current environment description 220. If the comparison indicates that the memory pressure has been reduced by at least a first threshold amount, then the reward determination module 206 generates a first reward value (e.g., +2 when using the reward values in FIG. 3). If the comparison indicates that the memory pressure has been increased by at least a second threshold amount, then the reward determination module 206 generates a second reward value (e.g., −2 when using the reward values in FIG. 3). If the comparison indicates that the memory pressure has been reduced by less than the first threshold amount or increased by less than the second threshold amount, then the reward determination module 206 generates a third reward value (e.g., 0 when using the reward values in FIG. 3).

By way of another example, if the goal of the resource management system 106 is to quickly import images from a network, then the reward determination module 206 compares the time taken to download each image (e.g., the time from sending the request via network I/O and receiving the entirety of the image via network I/O) in the previous environment description to the time taken to download each image text input the current environment description 220. If the comparison indicates that the time taken to download each image has been reduced (e.g., by at least a threshold amount), then the reward determination module 206 generates a higher reward value than if the time taken to download each image has not been reduced (e.g., by at least the threshold amount).

The reward determination module 206 provides the generated reward value 224 to the model update module 208, which updates 226 action values in the model 210 based on the reward value 224. In one or more implementations the model 210 is a table including multiple rows and columns corresponding to states and actions. For example, each row of the table can correspond to a state (one of the states that the state generation module 204 can determine that the application 104 is in) and each column of the table can correspond to an action. Each action refers to an action that can be taken by the application 104 to attempt to achieve the goal of the resource management system 106. The particular actions can vary based on the goal of the resource management system 106. These actions can include, for example, changing configuration settings or parameters of the application (e.g., a number of items requested at a time or a rate at which something occurs), changing an amount of resources used by a workflow (e.g., a number of threads spawned or used for performing a workflow), changing how long a particular activity is to be performed (e.g., a number of seconds to expend in performing a particular activity), and so forth. These actions modify usage of at least one computing device resource, such as memory, disk I/O bandwidth, network I/O bandwidth, and so forth.

For example, if the goal of the resource management system 106 is to reduce memory usage by the application 104 that contributes to memory pressure in the computing device 102, then various actions that can be taken by the application 104 to attempt to achieve the goal of the resource management system 106 can include, for example, increasing or decreasing the rate at which the application 104 releases memory, changing an amount of time that the application 104 will work on releasing memory, increasing or decreasing the amount of memory that is released at any given time (e.g., per release request), and so forth.

By way of another example, if the goal of the resource management system 106 is to increase the speed of data import by the application 104 so that a set of images can be quickly imported into memory from a disk drive by a workflow of the application 104 then various actions that can be taken by the application 104 to attempt to achieve the goal of the resource management system 106 can include, for example, increasing or decreasing the number of images that are retrieved at a time (e.g., retrieved concurrently), changing a number of images that are exported by the application 104 to the disk drive, performing or pausing other workflows of the application 104 that may affect the speed at which images are imported, and so forth.

Figure 4:
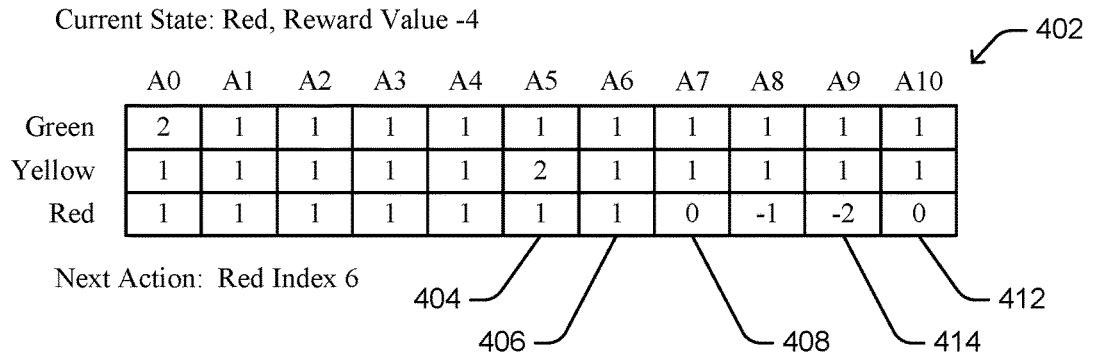
FIG. 4 illustrates an example of a model.
Figure 4:
Figure 4:
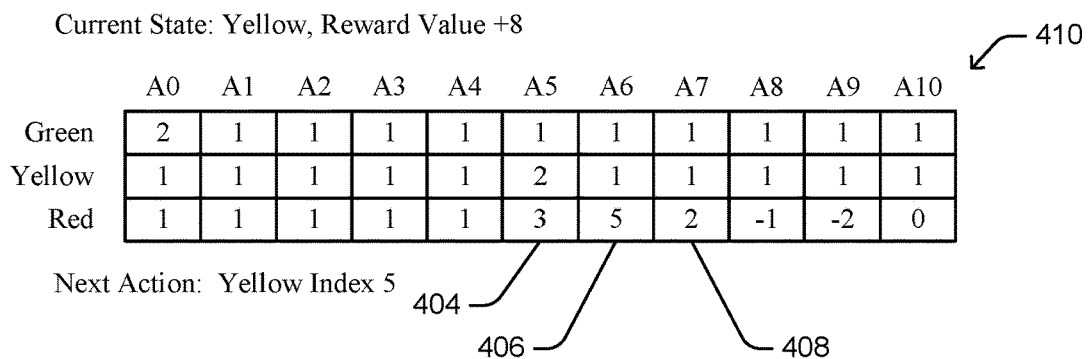

FIG. 4 illustrates an example 400 of a model. As shown in the example 400, a model 402 includes three rows, one for each of the three states green, yellow, and red. The model 402 also includes 11 columns, one for each possible action that the application 104 can take to attempt to achieve the goal of the resource management system 106, illustrated as A0, . . . , A10. Each cell in the model 402 includes an action value. For example, the cell 404 (corresponding to the red state and action A5) has an action value of 1, the cell 406 (corresponding to the red state and action A6) has an action value of 1, and the cell 408 (corresponding to the red state and action A7) has an action value of 0.

Returning to FIG. 2, the model update module 208 receives the reward value 224 and distributes the reward value 224 across one or more cells of the model 210. In one or more implementations, the model update module 208 distributes the reward value across the cell corresponding to the previous state of the application 104 and the previous action applied to the application 104, as well as cells adjacent to that cell for the same state. This distribution can take various forms, such as applying one-half of the reward value to the cell corresponding to the previous state of the application 104 and the previous action applied to the application 104, and one-quarter of the reward value to each of the cells adjacent to that cell for the same state. By way of another example, the distribution can be applying 0.9% of the reward value to the cell corresponding to the previous state of the application 104 and the previous action applied to the application 104, and 0.05% of the reward value to each of the cells adjacent to that cell for the same state.

For example, referring again to FIG. 4, assume that the action taken from model 402 was the action A6 corresponding to the red state, which corresponds to cell 406. Further assume that the reward value generated for taking that action was +8. An updated version of the model 410 is illustrated showing the cell 406 updated by adding one-half of the reward value to the action value in cell 406. The two cells adjacent to the cell 406 for the same state (the red state), cells 404 and 408, are updated by adding one-quarter of the reward value to the action values in each of cells 404 and 408.

Distributing the reward value 224 across the adjacent cells to the cell corresponding to the previous state of the application 104 and the previous action applied to the application 104 allows similar actions to be rewarded in the same manner as that previous action. For example, the model update module 208 assumes that the adjacent actions are more similar to the previous action than other actions (e.g., the previous action may be to increase the number of images requested by 4, and the adjacent cells may correspond to actions of increasing the number of images requested by 3 and 5). Accordingly, the model update module 208 assumes that those adjacent actions would result in similar awards. This allows the model 210 to be trained more quickly because in addition to the action value corresponding to the previous action being updated, action values corresponding to similar actions and the same state are also updated.

Returning to FIG. 2, additionally or alternatively the model update module 208 can distribute the reward value 224 across one or more cells of the model 210 in different manners. For example, the model update module 208 can apply all of the reward to the cell corresponding to the previous state of the application 104 and the previous action applied to the application 104. By way of another example, the model update module 208 can distribute the reward value across the cell corresponding to the previous state of the application 104 and the previous action applied to the application 104, as well as cells adjacent to that cell for the same action but different states. By way of another example, situations can arise in which there are not two cells adjacent to the cell corresponding to the previous state of the application 104 and the previous action applied to the application 104. For example, assume that the previous state of the application 104 and the previous action applied to the application 104 corresponds to cell 412 of FIG. 4. In this situation there is only one adjacent cell 414—there is no adjacent cell to the right of the cell 412. Accordingly, the reward value would be distributed among the cells 412 and 414 (e.g., one-half of the reward value to the cell 412, and one-quarter of the reward value to the cell 414).

In one or more implementations, distributing the reward value 224 among one or more cells of the model 210 includes adding the reward value 224 (or a portion of the reward value 224, such as one-half or one-quarter of the reward value 224) to the action value in one or more cells of the model 210.

The model update module 208 implements a reinforcement learning technique that seeks to find the best action to take in the given state. The action values are also referred to as q-values, where q refers to quality (how useful a given action is in gaining some future reward).

It should be noted that although a single model 210 is illustrated, the resource management system 106 can include multiple models 210. For example, each different workflow of the application 104 can have a different corresponding model 210, each such model optionally having different actions or states. Accordingly, the nature of the workflow that the application is performing at any given time can be used to determine which of the multiple models 210 to use.

The action selection module 212 selects an action based on the action values in the model 210, and outputs the selected action 228. The action selection module 212 selects an action based on one of multiple different policies. In one or more implementations, these policies include an action value based policy and a random policy. The action selection module 212 selects one of these multiple policies in a manner such that there is a higher probability (e.g., 90% probability) that the action value based policy is selected and a lower probability (e.g., 10% probability) that the random policy is selected. The action selection module 212 can select one of these two policies in various manners, such as using a Bernoulli distribution with a probability of 0.9 of selecting the action value based policy.

The action value based policy selects an action from the model 210 based on, for the current state of the application 104, the action that is performing the best so far (e.g., the action corresponding to the cell having the largest action value). In one or more implementations, the action selection module 212 selects the action corresponding to the largest action value for the current state. Additionally or alternatively, the action selection module 212 can select the action from among the actions corresponding to the cell in the model 210 having the largest action value and the actions corresponding to the adjacent cells for the current state.

The action selection module 212 can select from the actions corresponding to these cells randomly, or based on the action values. For example, selection values $e^{MaxValue}$, $e^{LeftValue}$, and $e^{RightValue}$ are calculated, where MaxValue refers to the action value for the cell in the model 210 having the largest action value for the current state, LeftValue refers to the action value for the cell in the model 210 adjacent to and to the left of the cell having the largest action value for the current state, and RightValue refers to the action value for the cell in the model 210 adjacent to and to the right of the cell having the largest action value for the current state. If there is no cell in the model 210 adjacent to and to the left of the cell having the largest action value for the current state then $e^{LeftValue}$ is equal to zero. Similarly, if there is no cell in the model 210 adjacent to and to the right of the cell having the largest action value for the current state then $e^{RightValue}$ is equal to zero. The action selection module 212 selects the action corresponding to one of these three cells in a manner such that the probability of selecting the action corresponding to the cell having the largest action value for the current state is $e^{MaxValue}$, the probability of selecting the action corresponding to the cell adjacent to and to the left of the cell having the largest action value for the current state is $e^{LeftValue}$, and the probability of selecting the action corresponding to the cell adjacent to and to the right of the cell having the largest action value for the current state is $e^{RightValue}$. The action selection module 212 can select one of these three actions in various manners, such as using a discrete distribution with these probabilities $e^{MaxValue}$, $e^{LeftValue}$, and $e^{RightValue}$.

The random policy selects an action from the model 210 randomly or pseudorandomly. The action selection module 212 can select an action randomly or pseudorandomly in various manners, such as using a uniform integer distribution to select one action among all possible actions. It should be noted that this random selection is independent of any of the action values in the model 210 (e.g., the action values in the model 210 are ignored in the random policy).

The action selection module 212 has both an exploit aspect and an expand aspect in selecting actions from the model 210. The exploit aspect is represented in the action value based policy due to the action value based policy taking advantage of or exploiting the cell having the largest action value for the current state. The expand aspect is represented in the random policy due to the random policy randomly selecting different actions regardless of action values, resulting in various different actions being tried and allowing discovery of valuable actions for different states that may otherwise have not been discovered due to a cell having a large action value or an action value that grows quickly.

The action selection module 212 provides the selected action 228 to both the storage module 216 and the action performance module 214. The storage module 216 stores current iteration data 230 in a data store 232. The current iteration data 232 includes various data generated by the resource management system 106, including the selected action 228, the current state 222, and the current environment description 220. The current state 222 becomes the previous state for the next iteration performed by the resource management system 106. The saving of the current iteration data 232 allows the data to be used to determine differences in state, data values, and so forth during the next iteration performed by the resource management system 106.

The action performance module 214 receives and performs the selected action 228. The selected action 228 can be performed in any of a variety of different manners, such as changing configuration settings of the application 104, invoking another module or system of the application 104 to take a particular action, and so forth.

The resource management system 106 thus learns, through reinforcement learning, which actions to take when the application 104 is in different states in order to achieve the goal of the resource management system 106. Different computing devices operate in different manners due to differences between the computing devices, such as different processor speeds, different numbers of processors or processor cores, different amounts of RAM, different storage device speeds, different network connection speeds, and so forth.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 5:
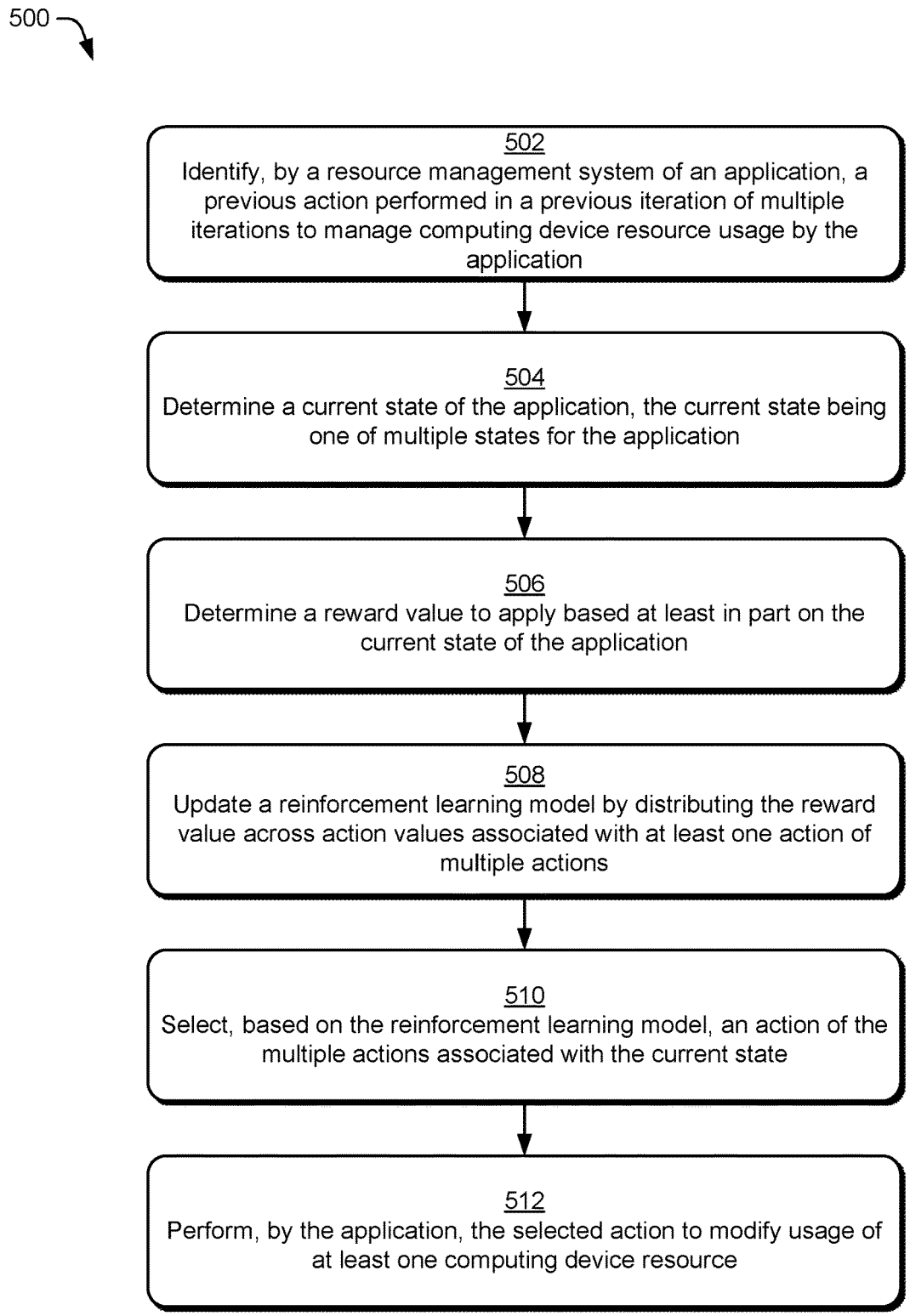
FIG. 5 is a flow diagram depicting a procedure in an example implementation of environment aware application-based resource management using reinforcement learning.

FIG. 5 is a flow diagram 500 depicting a procedure in an example implementation of environment aware application-based resource management using reinforcement learning. In this example, a previous action performed in a previous iteration of multiple iterations to manage computing device resource usage by an application is identified (block 502). This previous action is identified by, for example, a resource management system of the application. The previous action can be identified in various manners, such as retrieving an indication of the previous action that was selected and stored in the previous iteration.

A current state of the application, which is one of multiple possible states for the application, is determined (block 504). The current state of the application indicates a current health of the application.

A reward value to apply based at least in part on the current state of the application is determined (block 506). Various different reward values can be determined based on what the current state of the application is and what change, if any, there is between the previous state of the application and the current state of the application.

A reinforcement learning model is updated by distributing the reward value across action values associated with at least one action of the multiple actions (block 508). The reinforcement learning model associates each of the multiple actions with each of the multipole possible states for the application, such as using a table format. The reward value can be distributed across one or more action values in the reinforcement learning model.

An action of the multiple actions associated with the current state is selected based on the reinforcement learning model (block 510). This selection can made in various manners as discussed above, such as based on the action having a highest action value, randomly, and so forth.

The selected action is performed, by the application, to modify usage of at least one computing device resource (block 512). The selected action can be performed in a variety of different manners, such as changing configuration settings of the application, invoking another module or system to take a particular action, and so forth.

The procedure depicted in flow diagram 500 can be repeated any number of times, each being referred to as an iteration.

Example System and Device

Figure 6:
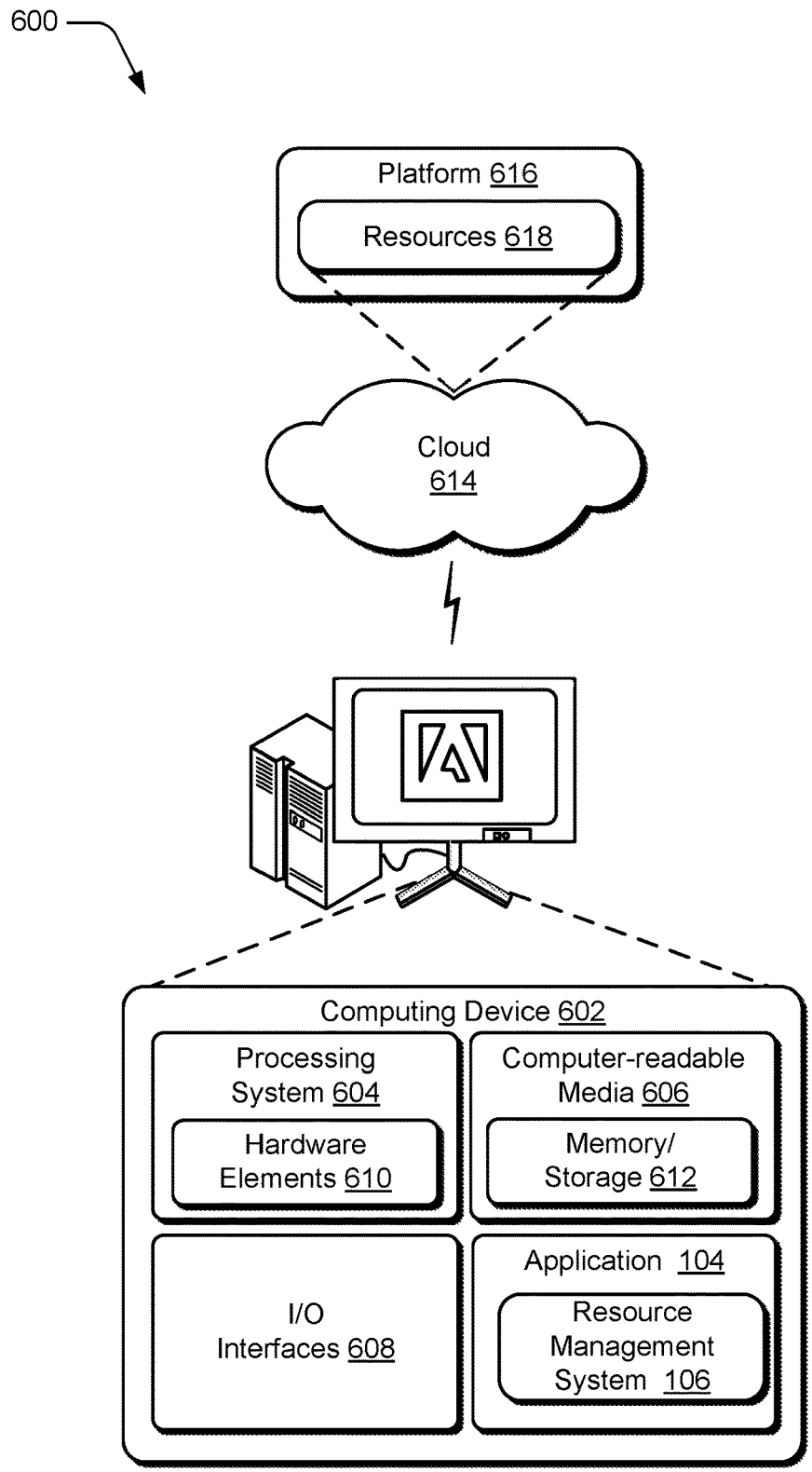
FIG. 6 illustrates an example system including various components of an example device that can be implemented as any type of computing device as described and/or utilized with reference to FIGS. 1-5 to implement aspects of the techniques described herein.

FIG. 6 illustrates an example system generally at 600 that includes an example computing device 602 that is representative of one or more computing systems and/or devices that may implement the various techniques described herein. This is illustrated through inclusion of the application 104 with the resource management system 106. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as RAM) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a resource management digital medium environment, a method implemented by at least one computing device across multiple iterations, and in each iteration the method comprising:
   identifying, by an application, a previous action performed in a previous iteration of the multiple iterations to manage computing device resource usage by the application;
   determining a current state of the application indicating a current health of the application, the current state being one of multiple states for the application;
   determining a reward value to apply based at least in part on the current state of the application;
   updating a reinforcement learning model which associates each of multiple actions with each of the multiple states, the reinforcement learning model being updated by distributing a first portion of the reward value to an action value associated with the previous action and a previous state in the previous iteration, and an additional portion of the reward value to an additional action value associated with an additional action and the previous state, the first portion of the reward value and the additional portion of the reward value being distributed in a same iteration of the multiple iterations;

selecting, based on the reinforcement learning model, an action of the multiple actions associated with the current state; and performing, by the application, the selected action to modify usage of at least one computing device resource.

2. The method of claim 1, wherein the determining the current state of the application comprises determining the current state of the application based on at least one of a nature of a workflow being performed by the application, a health of the application, and user interface activity for the application.

3. The method of claim 1, wherein determining the reward value comprises determining the reward value based on the current state being different than the previous state in the previous iteration, the reward value being greater if the current state is an improved state over the previous state.

4. The method of claim 1, wherein determining the reward value comprises determining the reward value based on a change in resources consumed by the application if the current state is a same state as the previous state in the previous iteration.

5. The method of claim 1, wherein the reinforcement learning model comprises a table including multiple columns and multiple rows corresponding to the multiple states and the multiple actions, updating the reinforcement learning model comprises distributing the reward value across a first cell of the table corresponding to the previous action and the previous state in the previous iteration, as well as one or more cells of the table corresponding to the previous state that are adjacent to the first cell.

6. The method of claim 5, wherein distributing the reward value comprises applying the first portion of the reward value to the first cell, a second portion of the reward value to a second cell that is adjacent to the first cell and corresponds to an action of the previous state, and a third portion of the reward value to a third cell that is adjacent to the first cell and corresponds to the additional action of the previous state.

7. The method of claim 6, wherein the first portion of the reward value comprises one-half of the reward value, the second portion of the reward value comprises one-quarter of the reward value and the third portion of the reward value comprises one-quarter of the reward value.

8. The method of claim 1, wherein selecting the action comprises selecting an action using a first policy and a second policy, the first policy comprising selecting the action based on which action in the reinforcement learning model corresponding to the current state has a largest action value, the second policy comprising selecting an action from the reinforcement learning model randomly.

9. The method of claim 8, wherein selecting the action comprises selecting one of the first policy and the second policy based on a distribution giving a probability of the first policy being selected at least seven times a probability of the second policy being selected.

10. The method of claim 8, wherein the reinforcement learning model comprises a table including multiple columns and multiple rows corresponding to the multiple states and the multiple actions, the first policy further comprises selecting the action from a set including a first action, a second action, and a third action, the first action corresponding to a first cell of the table corresponding to the current state and having the largest action value, the second action corresponding to a cell of the table corresponding to the current state and being adjacent to the first cell, and the third action corresponding to an additional cell of the table corresponding to the current state and being adjacent to the first cell.

11. In a content creation digital medium environment, a computing device comprising:

a processor; and computer-readable storage media having stored there on multiple instructions of an application that, responsive to execution by the processor, cause the processor to perform operations across multiple iterations, each iteration including:

identifying, by the application, a previous action performed in a previous iteration of the multiple iterations to manage computing device resource usage by the application;

determining a current state of the application indicating a current health of the application;

updating a reinforcement learning model by distributing a reward value across action values associated with at least one action, the reinforcement learning model associating each of multiple actions with each of multiple states of the application;

selecting between a first policy and a second policy to implement for selecting an action of the multiple actions associated with the current state, the first policy comprising selecting the action based on which action in the reinforcement learning model corresponding to the current state has a largest action value, the second policy comprising selecting the action from the reinforcement learning model randomly, the first policy having a higher probability of being selected than the second policy;

selecting, using the selected policy and based on the reinforcement learning model, the action of the multiple actions associated with the current state; and performing, by the application, the selected action to modify usage of at least one computing device resource.

12. The computing device of claim 11, wherein the reinforcement learning model comprises a table including multiple columns and multiple rows corresponding to the multiple states and the multiple actions, updating the reinforcement learning model comprises distributing the reward value across a first cell of the table corresponding to the previous action and a previous state in the previous iteration, as well as one or more cells of the table corresponding to the previous state that are adjacent to the first cell.

13. The computing device of claim 12, wherein distributing the reward value comprises applying a first portion of the reward value to the first cell, a second portion of the reward value to a second cell that is adjacent to the first cell and corresponds to an action of the previous state, and a third portion of the reward value to a third cell that is adjacent to the first cell and corresponds to an additional action of the previous state.

14. The computing device of claim 11, wherein a probability of the first policy being selected is at least seven times greater than a probability of the second policy being selected.

15. A system comprising:

an environment monitoring module, implemented at least in part in hardware, of an application to identify a previous action performed in a previous iteration of multiple iterations to manage computing device resource usage by the application;

a state generation module, implemented at least in part in hardware, to determine a current state of the application indicating a current health of the application, the current state being one of multiple states for the application;

means for selecting, based at least in part on the current state of the application and a reinforcement learning model, one of multiple actions to reduce resource usage by the application using a policy for selecting from the multiple actions, the reinforcement learning model comprising a table including multiple columns and multiple rows corresponding to the multiple states and the multiple actions, the policy comprising selecting the one action from a set including a first action, a second action, and a third action, the first action corresponding to a first cell of the table corresponding to the current state and having a largest action value, the second action and the third action corresponding to cells of the table corresponding to the current state and being adjacent to the first cell; and an action performance module, implemented at least in part in hardware, to perform the selected action to modify usage of at least one computing device resource.

16. The system of claim 15, wherein the means for selecting includes means for determining a reward value to be distributed among one or more cells of the reinforcement learning model, the reward value being based on the current state being different than a previous state in the previous iteration, and the reward value being greater if the current state is an improved state over the previous state.

17. The system of claim 15, wherein the means for selecting includes means for determining a reward value to be distributed among one or more cells of the reinforcement learning model, the reward value being based on a change in resources consumed by the application if the current state is a same state as a previous state in the previous iteration.

18. The system of claim 15, wherein the means for selecting includes means for updating the reinforcement learning model by distributing a reward value across a cell of the table corresponding to the previous action and a previous state in the previous iteration, as well as one or more cells of the table corresponding to the previous state that are adjacent to the cell.

19. The system of claim 15, wherein adjacent cells in the table which are adjacent to a respective cell correspond to actions that are more similar to an action associated with the respective cell than other actions associated with other cells.

20. The system of claim 15, wherein the state generation module determines the current state of the application based on at least one of a nature of a workflow being performed by the application, a health of the application, and user interface activity for the application.

* * * * *